(12) United States Patent
Timmermann (10) Patent No.: US 8,449,016 B2
(45) Date of Patent: May 28, 2013

(54) SEALING ARRANGEMENT FOR FIXED VEHICLE PANES, METHOD FOR THE PRODUCTION AND USE THEREOF

(75) Inventor: Alwin Timmermann, Cologne (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 13/381,894

(22) PCT Filed: Aug. 2, 2010

(86) PCT No.: PCT/EP2010/061208
§ 371 (c)(1),
(2), (4) Date: Dec. 30, 2011

(87) PCT Pub. No.: WO2011/018379
PCT Pub. Date: Feb. 17, 2011

(65) Prior Publication Data
US 2012/0126567 A1 May 24, 2012

(30) Foreign Application Priority Data
Aug. 13, 2009 (DE) .......................... 10 2009 026 369

(51) Int. Cl.
*B60J 1/10* (2006.01)

(52) U.S. Cl.
USPC ...... 296/146.15; 296/201; 277/921; 49/475.1

(58) Field of Classification Search
USPC ................. 296/146.16, 146.2, 201; 277/921, 277/906; 49/475.1
See application file for complete search history.

(56) References Cited

U.S. PATENT DOCUMENTS 6,070,363 A 6/2000 Vance
6,769,700 B2 8/2004 Ortmuller et al.

FOREIGN PATENT DOCUMENTS

| DE | 202008009712 | 11/2011 |
| EP | 1280675 | 3/2006 |
| EP | 1808322 | 7/2007 |
| WO | 01/85481 | 11/2001 |

OTHER PUBLICATIONS

PCT Written Opinion issued for PCT/EP2010/061208 filed Aug. 2, 2010 in the name of Saint-Gobain Glass France (German and English).
PCT International Search Report issued for PCT/EP2010/061208 filed Aug. 2, 2010 in the name of Saint-Gobain Glass France.

*Primary Examiner* — Lori Lyjak
(74) *Attorney, Agent, or Firm* — Steinfl & Bruno LLP (57) ABSTRACT

A sealing arrangement for vehicle panes is presented. The sealing arrangement has a mounting rail, a pane, and a cover connected by a connection point to a latching rail.

15 Claims, 8 Drawing Sheets

SEALING ARRANGEMENT FOR FIXED VEHICLE PANES, METHOD FOR THE PRODUCTION AND USE THEREOF

CROSS REFERENCE TO RELATED APPLICATIONS

The present application is the US national stage of International Application PCT/EP2010/061208 filed on Aug. 2, 2010, which, in turn, claims priority to German Patent Application DE 10 2009 026 369.1 filed on Aug. 13, 2009.

FIELD

The invention relates to a sealing arrangement for motor vehicle panes and a method for its production as well as its use according to the generic portions of the independent claims.

BACKGROUND

From EP 1 280 675 B1, a sealing arrangement for motor vehicle panes for the lower region of a motor vehicle windshield is known that is sealingly latched by means of a mounting rail with a water box cover and that the mounting rail has a seal that is arranged between the bottom edge of the pane and the upper edge of the water box cover and locks with its external surfaces substantially flush. However, this arrangement has the disadvantage that very small production tolerances are permitted for functional latching and functional sealing.

SUMMARY

The object of the present invention is to provide an improved sealing arrangement for motor vehicle panes while overcoming the disadvantages of the prior art with the simplest and most economical means possible with greater production tolerances made possible for functional latching and functional sealing.

The objects of the invention are accomplished through the characteristics of the independent claims. Advantageous embodiments of the invention are indicated through the characteristics of the subclaims.

The object of the invention is accomplished by a sealing arrangement for motor vehicle panes that comprises a mounting rail, a pane, and a cover connected by means of a connection point with a latching rail, wherein the mounting rail comprises a latching channel that is formed by a spring-loaded limb and a support body, the cover is latched in the latching channel with the latching rail, and a spring element is between a contact surface of the cover and the support body.

In a preferred embodiment of the invention, the spring element is fixedly connected to the support body of the mounting rail. Particularly preferably, it is adhesively bonded on the support body, extruded thereon, and/or installed as a prefabricated sealing profile in a corresponding groove.

The spring element can preferably be implemented as a solid material or as a hollow chamber profile. The spring element can have any shapes that achieve a sealing and resilient effect according to the invention in the sealing arrangement. The spring element can preferably be round, oval, rectangular, or U-shaped in its profile cross-section. Because of the elastic deformation of the spring element, the pressure necessary for resilience and sealing is exerted between the contact surface of the cover and the support body of the mounting rail. The material, the shape, the wall thickness in the case of hollow chamber profiles, as well as the volume of the spring element, in particular, are coordinated for the design of the spring characteristics.

In an advantageous embodiment of the invention, the mounting rail is bonded to the pane by an adhesive bond. The adhesive bond is preferably applied on the mounting rail as an adhesive film or adhesive bead. Customary thicknesses of adhesive films are 0.3 mm to 2 mm.

In a preferred embodiment, the spring element contains elastomers, thermoplastic elastomers and, preferably, ethylene-propylene-diene rubber, styrene butadiene rubber, polybutadiene rubber, nitrile rubber, chloroprene rubber, fluororubber, silicone rubber, polypropylene, polyvinyl chloride, acrylonitrile-butadiene-styrene, copolymers and/or mixtures thereof. The elastomers are preferred as suitable for the spring element.

The sealing arrangement principally seals the vehicle shell against moisture, such as water vapor, rain, and snow as well as any type of pollution from the environment. Not only the arrangement but also the shape, the reduction of wind noise as well as the propagation of vibration of the vehicle shell can influence the effect.

The positioning of the stop in the latching channel is determined by the shape of the latching channel and latching rail as well as their arrangement with the pane. The latching rail can include, at least partially, a protruding region that cooperates in the latching. Here, "latching" means the permanent connection, detachable only with a high expenditure of force, of at least two parts as a result of their shapes and expansion as well as their elastic material properties. For precise positioning of the latching rail and of the latching channel relative to each other, a positioning stop is definitively designed in the latching channel. The positioning stop is preferably a region of the support body and/or of the spring-loaded limb and, particularly preferably, a lip on the support body and/or on the spring-loaded limb. The positioning stop of the latching channel and the protruding region of the latching rail can be oriented at will in the latching channel.

The positioning stop is preferably mounted on the support body on the side of the latching channel oriented toward the pane and the protruding region of the latching rail is preferably facing the pane. However, the positioning stop can also be mounted on the spring-loaded limb on the side of the latching channel facing away from the pane and the protruding region of the latching rail can be directed away from the pane.

It is also advantageous that the latching rail is deflectably connected to the cover. Here, "deflectably" means that the latching rail can be bent at the connection point to the cover, for example, during the latching process, without breaking off of the mounting rail or being permanently deformed.

The latching rail preferably contains polypropylene, polyvinyl chloride, acrylonitrile-butadiene-styrene, copolymers and/or mixtures. The latching rail preferably has, for adjusting the deflection properties, a profile thickness of 0.2 mm to 1 mm at the connection to the cover.

Preferably, the distance D between the edge of the pane in the lower region and the rear edge of the cover is 0.05 mm to 5 mm and, preferably, 0.1 mm to 2 mm. The distance acts in the vehicle shell as a seam that is optically invisible or hardly visible or as a deliberate seam that is visible for shape purposes.

Also preferred is a round, wedge-shaped, or rectangular embodiment of the rear edge of the cover. These embodiments permit, in particular, combining the necessity of a hardly visible seam with a satisfactory production tolerance in the installation of the sealing arrangement.

It is also advantageous for the positioning stop in the latching channel to be rounded. The positioning stop is preferably rounded such that it forms, together with the protruding region of the latching rail, a swivel joint. Through the joint-like arrangement of the positioning stop and of the latching rail, the latching rail can also be inserted slantwise into the latching channel and can be latched while retaining the predetermined position.

In another preferred embodiment of the invention, the protruding region of the latching rail is unformed in segments. The segments with an unformed protruding region can have a length of 2 mm up to 50 mm, preferably of 15 mm to 30 mm. During installation of the cover, the protruding region of the latching rail bends a spring-loaded limb of the mounting rail. With the aforementioned segmentation, it is achieved during the installation process that one segment with a protruding region is always latched before the next segment with a protruding region starts to bend the spring-loaded limb. The latching of a segment with a protruding region occurs in each case with an acoustic click that is an effective control of a successful latching process.

In another preferred embodiment of the invention, subsections of the latching rail are recessed. The recesses can be implemented in the form of slits with a width of 0.1 mm to 2 mm. However, the recesses and the segments of the latching rail can also have a length of 2 mm up to 50 mm. An advantage of a segmented latching rail lies in the improved flexibility of the latching rail during the installation process.

The object of the invention is further accomplished through a method for production of a sealing arrangement, wherein a mounting rail is permanently bonded by means of an adhesive connection to a pane, a cover with a latching rail in a latching channel is pressed beyond a positioning stop under tensioning of the spring element between a support body and a contact surface of the cover, the cover moves back under partial relaxation of the spring element until impact of the latching rail against the positioning stop and thus assumes a defined position relative to the pane.

In a preferred embodiment, the mounting rail is positioned with an installation-keder or a stationary guide element positioned relative to the pane. In this case, a stationary guide element means that an installation aid for the mounting rail has a stationary position relative to the position of the pane.

The installation aid enables precise positioning of the mounting rail relative to the pane before adhesion of the parts. An installation-keder also means an installation aid before adhesion of the parts. The installation-keder is a spacer relative to the edge of the pane, which spacer is inserted in the latching channel and can subsequently be removed.

In a preferred embodiment, the latching rail of the cover, recessed in subregions, is, in particular, latched with slight bending in segments into the latching channel. With the bending and latching of a segmented latching rail, a clearly perceptible acoustic click is generated. The acoustic click indicates successful latching and is very helpful in the context of quality control of the latching.

Particularly preferably, the method for installation of a sealing arrangement is used in the lower region of a motor vehicle windshield.

BRIEF DESCRIPTION OF THE DRAWINGS

Additional characteristics, details, and advantages of the invention emerge from the text of the subclaims as well as from the following description of exemplary embodiments with reference to the drawings.

They depict.

DETAILED DESCRIPTION

Figure 1:
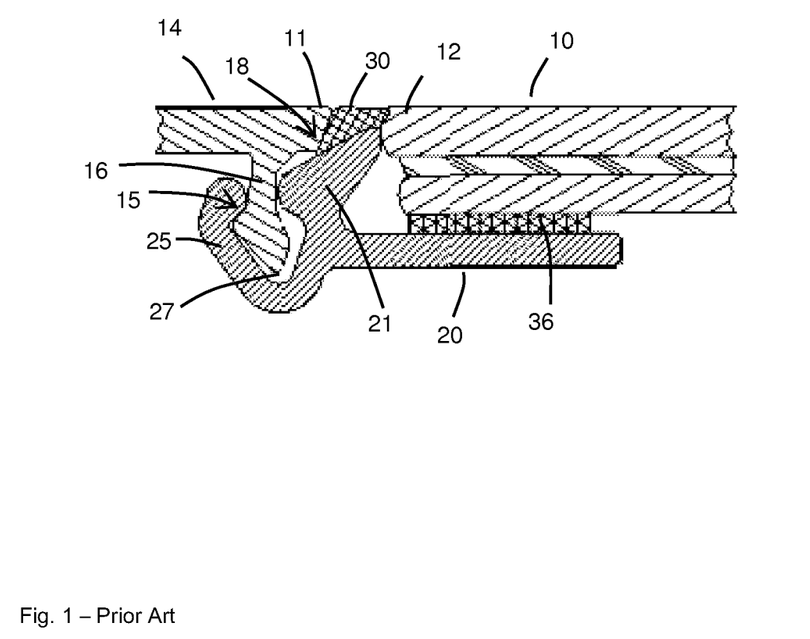
FIG. 1 a view of a cross-section of a sealing arrangement for motor vehicle panes according to the prior art, FIG. 2 a view of a cross-section of a sealing arrangement for motor vehicle panes according to the invention, depicted in FIG. 7, FIG. 3 a view of a cross-section of a sealing arrangement for motor vehicle panes according to the invention, depicted in FIG. 7, FIG. 4 a view of a cross-section of a sealing arrangement for motor vehicle panes according to the invention, FIG. 5 an exemplary embodiment of a method according to the invention for production of a sealing arrangement for motor vehicle panes in a flow diagram, FIG. 6 spatial representations of embodiments of the cover according to the invention, FIG. 7 a plan view of a sealing arrangement for motor vehicle windshield according to the invention, and FIG. 8 a spatial representation of a sealing arrangement for motor vehicle panes according to the invention, depicted in FIG. 7.

FIG. 1 depicts a comparative example of a sealing arrangement for motor vehicle panes according to the prior art. A motor vehicle windshield (10) was brought into frictional and positive contact on the lower margin (12) with a seal (30). The seal (30) was formed from a solid material, whose bottom side was in sealing contact on the contact region of the upper edge (18) of a water box cover (14). In FIG. 1, it is discernible that the outer surface of the pane (10) ended with the outer region of the seal (30) and the outer surface of the water box cover (14) substantially flush and aligned. The mounting rail (20) included a support body (21) in the central region. The mounting rail (20) was affixed on the back side of the pane (10) with a bead of adhesive (36), which, for its part, lay flat inside on the vehicle body. A latching rail (16) was latched in a latching channel (27) with positive locking against the positioning stop (15) and thus connected to the cover (14), mounting rail (20), and pane (10). Because of the frictional and positive contact of the seal (30) with the cover (14) and the pane (10) as well as the positive latching in a latching channel (27), high demands on production tolerances as well as installation were necessary to achieve a leakproof and permanently connected sealing arrangement for motor vehicle panes.

Figure 2:
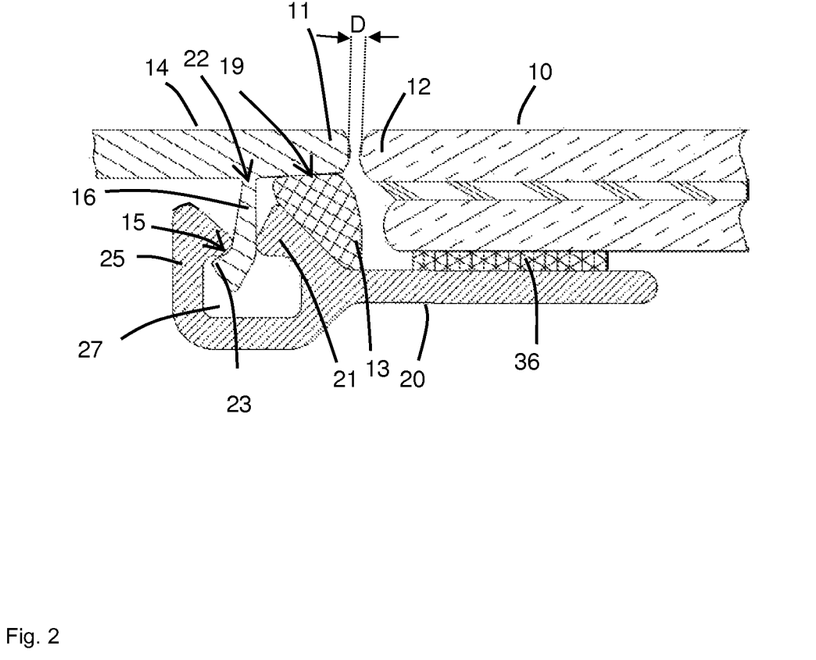
Figure 7:
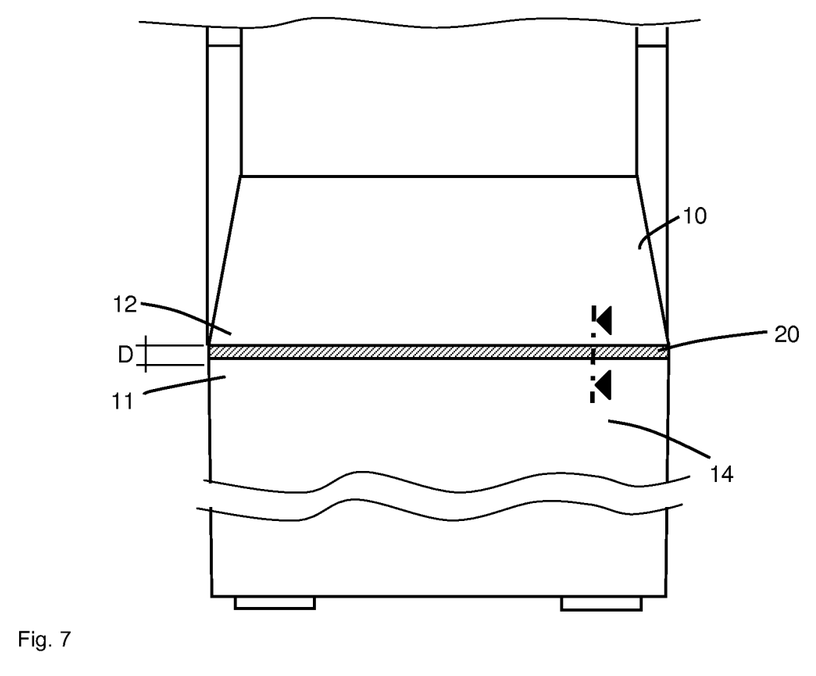

FIG. 2 shows a sealing arrangement for motor vehicle panes according to the invention in cross-section, depicted in FIG. 7. A motor vehicle windshield (10) was connected on the lower margin (12) by means of a mounting rail (20) to a water box cover (14). The water box cover (14) included a latching rail (16) with a protruding region (23) of the latching rail (16) oriented away from the pane (10) and a contact surface (19) lying on the internal side of the water box cover (14). The rear edge (11) of the water box cover (14) facing the margin of the lower region (12) of the windshield (10) was rounded. The edge in the lower region (12) of the windshield (10) and the rear edge (11) of the water box cover (14) were arranged with a mean distance between them (D) of 0.3 mm and with the surfaces aligned. Between the rear edge (11) of the cover (14) and the edge on the lower margin (12) of the windshield (10) there was a free gap without sealing material. The profile thickness in the connection region (22) between latching rail (16) and water box cover (14) was 0.5 mm. A mounting rail (20) formed, with a spring-loaded limb (25) and a support body (21), a latching channel (27). The mounting rail (20) contained, for example, polypropylene. The mounting rail (20) was connected by means of a 0.8 mm thick adhesive bond (36) with poly acrylate to the internal side of the lower edge (12) of the windshield (10). The support body (21) was oriented toward the lower edge (12) of the windshield (10). The spring-loaded limb (25) included a positioning stop (15) for the latching rail (16) and formed the side of the latching channel (27) facing away from the pane (10). The latching channel (27) was open toward the cover (14) and latched with the inward pointing latching rail (16) of the cover (14). The latching channel (27) was implemented 3 mm deep. During the installation of the cover (14), the spring element (13) was compressed between support body (21) and contact surface (19) of the cover (14). The compressed spring element (13) pressed permanently on the contact surface (19) of the cover (14). By this means, the protruding region (23) of the latching rail (16) was pulled against the positioning stop (15). By means of the tensile loading of the protruding region (23) of the latching rail (16) against the positioning stop (15), a secure positioning of the cover (14) in the mounting rail (20) was obtained. The secure positioning was ensured without the spring-loaded limb (25) positively surrounding the protruding region (23) of the latching rail (16). The spring element (13) was made of ethylene-propylene-diene rubber. By means of the large range of movement of the spring element (13), it was possible, even with large tolerances of the latching rail (16) and mounting rail (20), to obtain a secure latching at the time of installation.

The positioning stop (15) was implemented as a lip on the spring-loaded limb (25).

The latching channel (27) was filled only to roughly 50% of its depth by the latching rail (16). The positioning stop (15) held the latching rail (16) under pressure of the spring element (13) and of the spring-loaded limb (25) permanently in a defined latching position of the latching channel (27). Because of the defined position of the latching rail (16) in the latching channel (27), a precise sealing arrangement was produced by the water box cover (14), windshield (10), and mounting rail (20). Through the sealing action of the spring element (13) on the contact surface (19), a satisfactory water seal was produced between the windshield (10) and the water box cover (14). Compared to the prior art, despite the distance (D) between the windshield (10) and the water box cover (14), a sealing arrangement and precise positioning of the windshield (10) and the water box cover (14) were achieved. It was possible to significantly better meet the high demands on production tolerances and installation.

Figure 3:
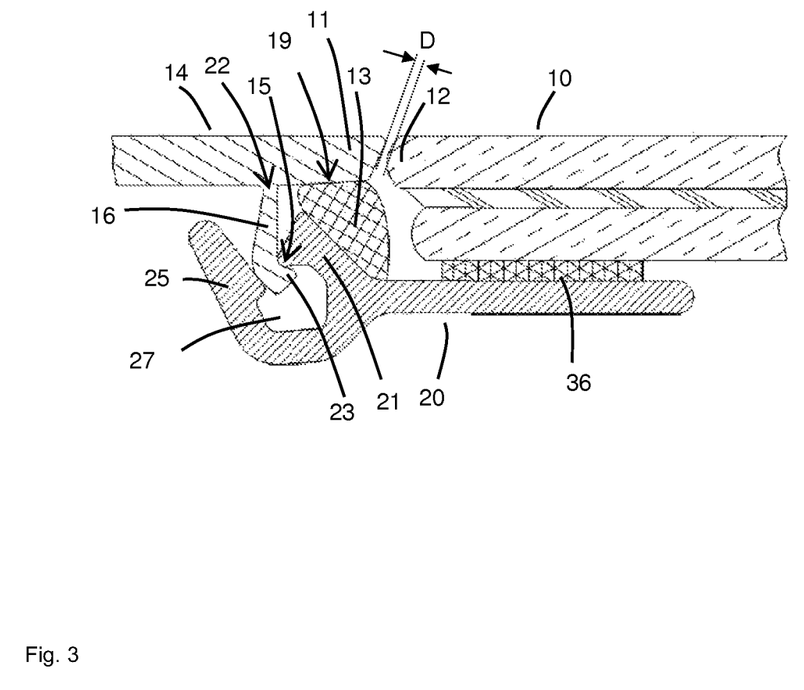
Figure 8:
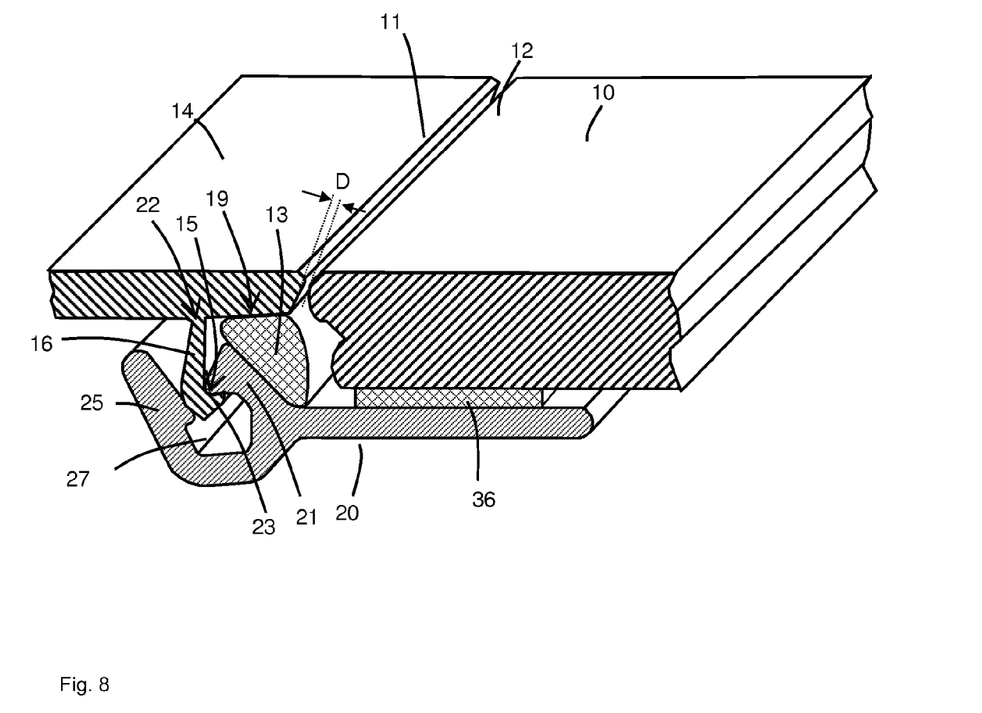

FIG. 3 and FIG. 8 depict an alternative embodiment of the sealing arrangement according to the invention. Compared to the exemplary embodiment of FIG. 2, the positioning stop (15) was arranged on the side of the latching channel (27) facing the windshield (10). The protruding region (23) of the latching rail (16) was accordingly oriented in the direction of the pane (10). The positioning stop (15) held the latching rail (16), under pressure of the spring element (13) and of the spring-loaded limb (25), permanently in a defined latching position of the latching channel (27). The positioning stop (15) was implemented as a lip on the support body (21). The positioning stop (15) and the protruding region (23) of the latching rail (16) were implemented rounded, such that, independent of the multidimensional curvature of the windshield, a precise sealing arrangement was achieved. It was possible to significantly better meet the high demands on production tolerances and installation.

Figure 4:
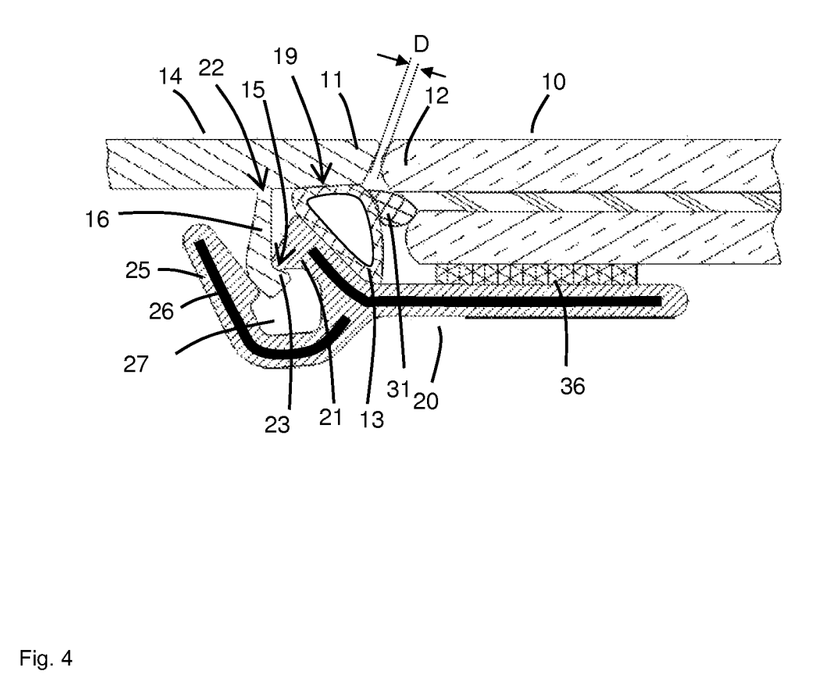

FIG. 4 depicts another alternative embodiment of the sealing arrangement. Compared to the exemplary embodiments of FIG. 2 and FIG. 3, the spring element (13) was designed as a hollow chamber profile with a wall thickness of 0.1 mm to 2 mm. The spring-loaded limb (25) and the support body (21) included a stiffening insert (26) made of aluminum. In addition, the spring element (13) had, under the cover (14), a seal extension (31) with ethylene-propylene-diene rubber to the glass. In the latched state, the spring element presses the seal (31), under the cover (14), against the glass. Between the rear edge (11) of the cover (14) and the edge on the lower margin (12) of the windshield (10), there was still a free gap without sealing material. By means of the improved spring characteristics and stiffness of the mounting rail (20), it was possible to achieve an improved latching effect, positioning of the sealing arrangement, and sealing of the contact surface (19). By means of the additional seal extension (31), it was likewise possible to further improve the seal of the sealing arrangement. It was possible to significantly better meet the high demands on production tolerances and installation.

Figure 5:
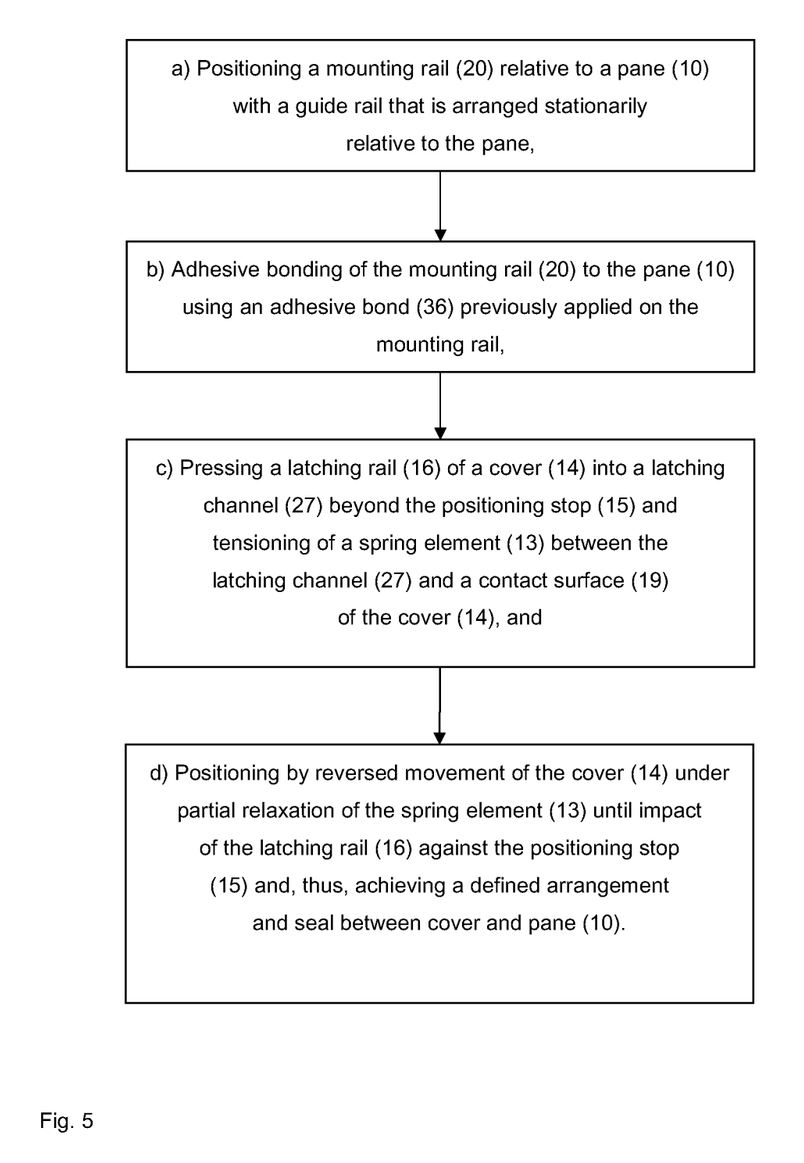

FIG. 5 illustrates in detail the process steps according to the invention for production of a sealing arrangement of motor vehicle panes.

Figure 6:
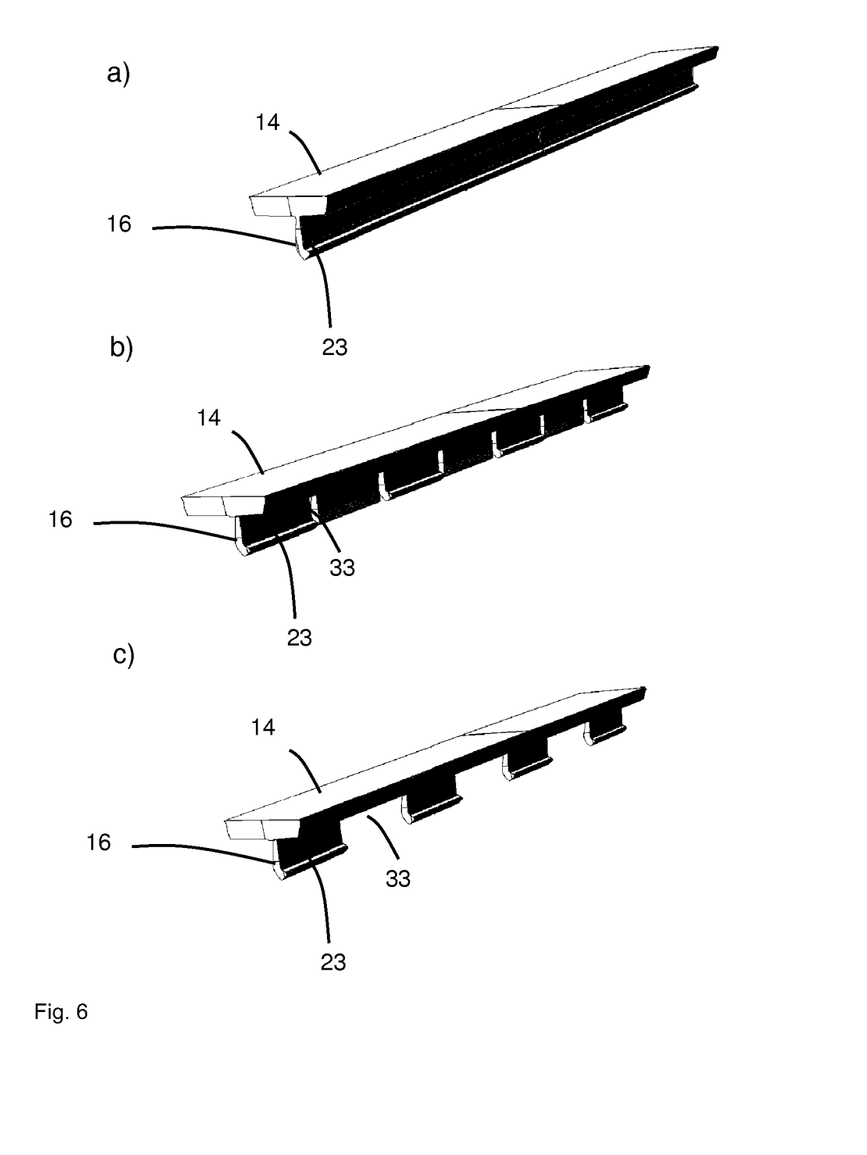

FIG. 6 depicts embodiments of the cover (14). FIG. 6a depicts the cover (14) with a continuous latching rail (16). FIG. 6b depicts an advantageous cover (14) with latching rails (16), into which slit-shaped recesses (33) were introduced. Also, in contrast, every second resulting segment of the latching rail (16) was implemented without a protruding region (23) and thus without a latching function. In the cover (14) according to FIG. 6c, every second segment of the latching rail (16) was completely cut out. In the installation process of the latching rail (16) according to FIG. 6a into the latching channel (27), acoustic click was hardly audible. In contrast with that, during latching with the advantageous latching rail (16) according to FIG. 6b and the particularly advantageous latching rail according to FIG. 6c, a clear acoustic click was audible. The latching rails (16) according to FIGS. 6a and 6b had in the latching channel (27) high guidance stability against forces acting at right angles to the latching rail. A bending of the latching rail (16) and a latching in segments were possible with the latching rails (16) according to FIGS. 6b and 6c. Thus, a simpler latching in of the cover (14) into the mounting rail (20) was enabled in the method according to the invention.

FIG. 7 depicts a plan view of an embodiment according to the invention of the sealing arrangement in a motor vehicle. The lower margin (12) of the pane (10) was connected to the water box cover (14) with a distance (D) between them of 0.3 mm via the mounting rail (20). Inside the joint, a subregion of the mounting rail (20) is depicted.

LIST OF REFERENCE CHARACTERS 10 pane,
11 rear edge of the cover,
12 lower margin of the pane,
13 spring element,
14 cover,
15 positioning stop,
16 latching rail,
18 contact region,
19 contact surface,
20 mounting rail,
21 support body,
22 connection of latching rail and water box cover,
23 protruding region,
25 spring-loaded limb,
26 stiffening insert,
27 latching channel,
30 sealing profile,
31 seal extension,
33 recess,
36 adhesive bond,
D distance between the rear edge of cover and the lower margin of the pane.

The invention claimed is:

1. A sealing arrangement for motor vehicle panes, comprising:
   a mounting rail,
   a pane,
   an adhesive connection bonding the mounting rail to the pane, and
   a cover connected by way of a connection point to a latching rail, wherein:
      the mounting rail comprises a latching channel that is formed by a contact tongue and a support body,
      the cover is latched in the latching channel with the latching rail, and
      a spring element is mounted between a contact surface of the cover and the support body such that a free distance of 0.1 mm to 2 mm between a margin of a lower region of the pane and rear edge of the cover is provided.

2. The sealing arrangement according to claim 1, wherein the spring element is connected to the support body.

3. The sealing arrangement according to claim 1, wherein the spring element is configured as a solid material or as a hollow chamber profile.

4. The sealing arrangement according to claim 1, wherein the spring element contains elastomers, thermoplastic elastomers and, preferably, ethylene-propylene-diene rubber, styrene butadiene rubber, polybutadiene rubber, nitrile rubber, chloroprene rubber, fluororubber, silicone rubber, polypropylene, polyvinyl chloride, acrylonitrile-butadiene-styrene, copolymers and/or mixtures thereof.

5. The sealing arrangement according to claim 1, wherein the connection point has a thickness of 0.2 mm to 1 mm.

6. The sealing arrangement according to claim 1, wherein at least one positioning stop is arranged on a side of the latching channel facing away from the pane.

7. The sealing arrangement according to claim 1, wherein at least one positioning stop is arranged on a side of the latching channel facing the pane.

8. The sealing arrangement according to claim 1, wherein the latching rail is deflectably connected to the cover.

9. The sealing arrangement according to claim 7, wherein the positioning stop is rounded.

10. The sealing arrangement according to claim 1, wherein the latching rail comprises subsections with recesses, subsections without protruding sections, or subsections with recesses and without protruding sections.

11. A method for production of a sealing arrangement, comprising:
    permanently bonding a mounting rail to a pane by way of an adhesive connection,
    pressing a cover with a latching rail into a latching channel beyond a positioning stop under tensioning of a spring element between a support body and a contact surface of the cover, and
    effecting a reversed movement of the cover, whereby the cover moves back under relaxation of the spring element and the latching rail is pushed back against the positioning stop, the cover thus assuming a defined position relative to the pane.

12. The method according to claim 11, wherein the cover is connected in segments to the mounting rail.

13. The method according to claim 11, said method being for installation of a sealing arrangement in a lower region of a motor vehicle windshield.

14. A method comprising:
    using the sealing arrangement according to claim 1 in a lower region of a motor vehicle windshield and a rear region of a water box cover.

15. The method according to claim 11, wherein the defined location of the cover relative to the pane is defined by a free distance between a lower region of the pane and a rear edge of the cover.

* * * * *